(12) United States Patent
Schall et al.

(10) Patent No.: US 10,638,550 B2
(45) Date of Patent: Apr. 28, 2020

(54) PANE WITH AN ELECTRICAL HEATING REGION

(71) Applicant: SAINT-GOBAIN GLASS FRANCE, Courbevoie (FR)

(72) Inventors: Guenther Schall, Kreuzau (DE); Valentin Schulz, Niederzier (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 290 days.

(21) Appl. No.: 15/506,143

(22) PCT Filed: Aug. 19, 2015

(86) PCT No.: PCT/EP2015/069001
§ 371 (c)(1),
(2) Date: Feb. 23, 2017

(87) PCT Pub. No.: WO2016/034413
PCT Pub. Date: Mar. 10, 2016

(65) Prior Publication Data
US 2017/0251526 A1  Aug. 31, 2017

(30) Foreign Application Priority Data

Sep. 4, 2014 (EP) .................................... 14183518

(51) Int. Cl.
*H05B 3/86* (2006.01)
*H05B 3/12* (2006.01)
(Continued)

(52) U.S. Cl.
CPC ............ *H05B 3/86* (2013.01); *B23K 26/351* (2015.10); *B32B 17/10036* (2013.01);
(Continued)

(58) Field of Classification Search
CPC ... H05B 3/86; H05B 3/12; H05B 3/84; B23K 26/351; B23K 2101/36; H05N 2203/005;
(Continued)

(56) References Cited

U.S. PATENT DOCUMENTS 3,409,759 A  11/1968 Boicey et al.
5,414,240 A  5/1995 Carter et al.
(Continued)

FOREIGN PATENT DOCUMENTS

CA  2893808 A1  6/2014
CN  1685765 A  10/2005
(Continued)

OTHER PUBLICATIONS

International Search Report for PCT/EP2015/069002 filed Aug. 19, 2015 on behalf of Saint-Gobain Glass France. dated Oct. 7, 2015. 7 pages (German original + English translation).
(Continued)

*Primary Examiner* — Shawntina T Fuqua
(74) *Attorney, Agent, or Firm* — Pillsbury Winthrop Shaw Pittman LLP

(57) ABSTRACT

A pane with an electrical heating region is presented. The pane has a substantially trapezoidal first pane, an electrically conductive coating applied on part of a surface of the first pane, a substantially trapezoidal electrical heating region that is electrically divided from the electrically conductive coating by a separating line, and two collecting conductors connected to the electrically conductive coating in the electrical heating region.

27 Claims, 8 Drawing Sheets

Figure 1A:
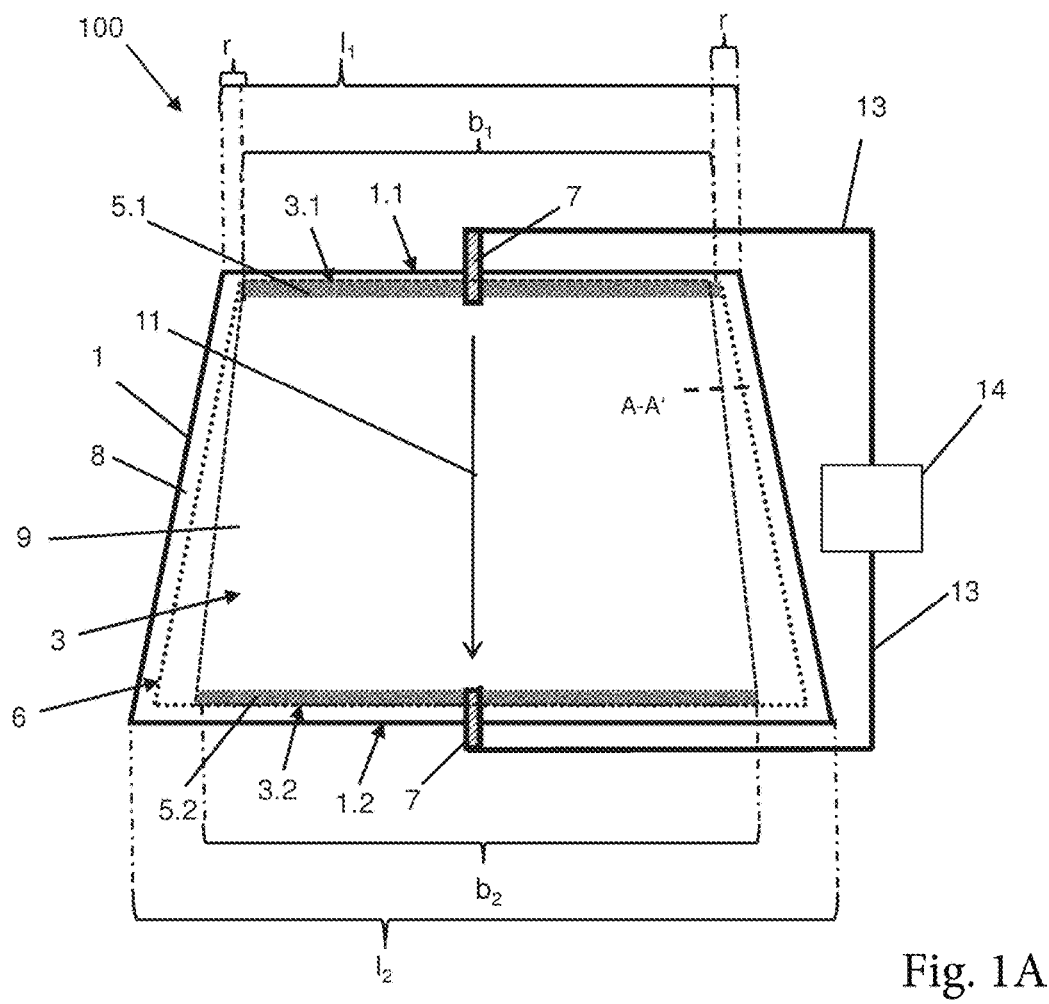

(51) Int. Cl.
  *B32B 17/10* (2006.01)
  *H05B 3/84* (2006.01)
  *B23K 26/351* (2014.01)
  *B23K 101/36* (2006.01)

(52) U.S. Cl.
  CPC .. *B32B 17/10183* (2013.01); *B32B 17/10761* (2013.01); *B32B 17/10788* (2013.01); *H05B 3/12* (2013.01); *H05B 3/84* (2013.01); *B23K 2101/36* (2018.08); *H05B 2203/005* (2013.01); *H05B 2203/008* (2013.01); *H05B 2203/011* (2013.01); *H05B 2203/013* (2013.01); *H05B 2203/016* (2013.01); *H05B 2203/017* (2013.01)

(58) Field of Classification Search
  CPC ....... H05N 2203/008; H05N 2203/011; H05N 2203/013; H05N 2203/016; H05N 2203/017
  See application file for complete search history.

(56) References Cited

U.S. PATENT DOCUMENTS

| | | |
|---|---|---|
| 2002/0045037 A1 | 4/2002 | Boire et al. |
| 2004/0065651 A1 | 4/2004 | Voeltzel |
| 2007/0020465 A1 | 1/2007 | Thiel et al. |
| 2011/0108537 A1 | 5/2011 | Schall |
| 2013/0082043 A1 | 4/2013 | McCarthy |

FOREIGN PATENT DOCUMENTS

| | | |
|---|---|---|
| CN | 2891574 Y | 4/2007 |
| CN | 102960053 A | 3/2013 |
| CN | 203151777 U | 8/2013 |
| DE | 3644297 A1 | 7/1987 |
| DE | 4316575 C1 | 7/1994 |
| DE | 10 2006 002681 A1 | 8/2006 |
| DE | 102008018147 A1 | 10/2009 |
| DE | 102008029986 A1 | 1/2010 |
| DE | 202008017611 U1 | 4/2010 |
| EP | 0788294 A2 | 1/1997 |
| EP | 0847965 B1 | 10/2004 |
| EP | 2200097 A1 | 12/2008 |
| EP | 2139049 A1 | 12/2009 |
| EP | 2334141 A1 | 6/2011 |
| GB | 2186769 A | 8/1987 |
| GB | 2381179 A | 4/2003 |
| JP | S62-172660 U | 11/1987 |
| JP | 2000-138093 A | 5/2000 |
| JP | 2003-163071 A | 6/2003 |
| JP | 2010-251230 A | 11/2010 |
| JP | 2013-532115 A | 8/2013 |
| KR | 10-2013-0066656 A | 6/2013 |
| KR | 10-2013-0096276 A | 8/2013 |
| KR | 10-2013-0139335 A | 12/2013 |
| WO | 00/72635 A1 | 11/2000 |
| WO | 2011006743 A1 | 1/2011 |
| WO | 2012031907 A1 | 3/2012 |
| WO | 2012031908 A1 | 3/2012 |
| WO | 2012052315 A1 | 4/2012 |
| WO | 2014/095153 A1 | 6/2014 |

OTHER PUBLICATIONS

International Search Report for PCT/EP2015/069001 filed Aug. 19, 2015 on behalf of Saint-Gobain Glass France. dated Oct. 5, 2015. 7 pages (German original + English translation).

Prior Art

T7: 37.5 °C – 40.0 °C
T6: 35.0 °C – 37.5 °C
T5: 32.5 °C – 35.0 °C
T4: 30.0 °C – 32.5 °C
T3: 27.5 °C – 30.0 °C
T2: 25.0 °C – 27.5 °C
T1: 22.5 °C – 25.0 °C

T7: 37.5 °C – 40.0 °C
T6: 35.0 °C – 37.5 °C
T5: 32.5 °C – 35.0 °C
T4: 30.0 °C – 32.5 °C
T3: 27.5 °C – 30.0 °C
T2: 25.0 °C – 27.5 °C
T1: 22.5 °C – 25.0 °C

PANE WITH AN ELECTRICAL HEATING REGION

CROSS-REFERENCE TO RELATED APPLICATIONS

The present application is the U.S. National Stage of International Patent Application No. PCT/EP2015/069001 filed on Aug. 19, 2015 which, in turn, claims priority to European Patent Application No. 14183518.1 filed on Sep. 4, 2014.

The invention relates to a pane with an electrical heating region, a method for its production, and its use.

The field of vision of a motor vehicle pane, in particular of a windshield, must be kept free of ice and condensation. In motor vehicles with an internal combustion engine, an air current heated by engine heat can, for example, be directed to the panes.

Alternatively, the pane can have an electrical heating function. U.S. Pat. No. 3,409,759 A and EP 0 788 294 A1 disclose composite panes, in which thin wires are laminated into the composite pane. By means of an external voltage source, an electrical current, which heats the wires and, hence, the pane, can be guided through the wires.

Further known are composite panes that have a transparent, electrically conductive coating on an inside surface of one of the individual panes. By means of an external voltage source, an electrical current, which heats the coating and, hence, the pane, can be guided through the electrically conductive coating. WO2012/052315 A1 discloses, for example, such a heatable, electrically conductive coating on a metal basis.

The electrical contacting of the electrically conductive coating is typically done via collecting conductors, as is known from US 2007/0020465 A1. The collecting conductors are made, for example, from a printed-on and fired silver paste. The collecting conductors typically run along the upper and lower edge of the pane. The collecting conductors collect the current, which flows through the electrically conductive coating and guide it to external supply lines, which are connected to a voltage source.

The object of the present invention consists in providing an improved pane with an electrical heating region with more uniform heating power distribution that is simple and economical to produce.

The object of the present invention is accomplished according to the invention by a pane with an electrical heating region according to the independent claims. Other embodiments emerge from the subclaims.

The pane according to the invention with an electrical heating region comprises at least the following characteristics:
- a substantially trapezoidal first pane with a surface III, a first base with length $l_1$ and a second base with length $l_2$, wherein the ratio v of the lengths of the bases $v=l_1:l_2$ is from 0.70:1 to 0.98:1,
- at least one electrically conductive coating that is applied at least on a part of the surface III,
- at least one substantially trapezoidal electrical heating region that is electrically divided by at least one separating line from the electrically conductive coating and a first base of the electrical heating region is arranged immediately adjacent the first base of the first pane and a second base of the electrical heating region is arranged immediately adjacent the second base of the first pane,
- at least two collecting conductors provided for connection to a voltage source, which are connected to the electrically conductive coating in the electrical heating region such that a current path for a heating current is formed between the collecting conductors, wherein the ratio of the length $b_1$ of the first base of the heating region to the length $b_2$ of the second base of the heating region, with a given ratio v, $b_1:b_2$ is from v:0.99 to v:0.50.

Here, the term "a substantially trapezoidal pane" describes a pane with a roughly trapezoidal contour. As is customary, in the following, the two parallel or substantially parallel sides of the trapezoid are called bases and the two adjacent (generally not parallel) sides are referred to as legs.

The substantially trapezoidal contour of the pane can have one or a plurality of curved or bent side edges. Thus, in many such panes, the bases of the trapezoid are in any case curved. In contrast, the legs are often substantially rectilinear. Furthermore, the corners of the pane can be rounded. The same holds for the substantially trapezoidal heating region. The collecting conductors can have a rectilinear course or, preferably, run along the bases of the pane and emulate their curvature. There can also be a distance between the collecting conductors and the base of the pane, wherein, for example, another electrical heating region, such as windshield wiper field heating, can be arranged.

In prior art panes without separating lines, the electrical heating region corresponds to the region of the electrically conductive coating. Such panes usually have very inhomogeneous heating power distribution. They have, during heating, particularly in the region of the longer base, lower heating power and, hence, a lower temperature as well as poorer deicing and defogging behavior.

The invention is based on the knowledge that by means of separating lines, an electrical heating region according to the invention is implemented and by this means optimization of the current path can be obtained. This results in more homogeneous heating power distribution and temperature distribution. At the same time, the patterning effort for the introduction of the separating lines remains temporally and financially acceptable from an economic standpoint.

The separating lines must be implemented particularly thin in order to impair vision through the pane as little as possible. In an advantageous embodiment of the pane according to the invention, the width d of the separating lines is from 30 µm to 200 µm and preferably from 70 µm to 140 µm. This has the particular advantage that separating lines with such a low width do not or only slightly impair vision through the pane.

Panes according to the invention have a first base with length $l_1$ and a second base with length $l_2$, wherein the ratio v of the lengths of the bases $v=l_1:l_2$ is from 0.70:1 to 0.98:1.

The length of the respective base of the first pane is calculated along the path of the side edge and, hence, along a possible curvature of the pane.

The at least one electrically conductive coating is applied at least on a part of the surface III and, in particular, on the entire surface III of the pane, minus an edge decoating and possibly minus decoated regions, which serve, for example, as communication windows.

The substantially trapezoidal electrical heating region is electrically divided by at least one separating line from the electrically conductive coating. In the case of a division by exactly one separating line, the separating line preferably describes the contour of a trapezoid. The collecting conductors are then arranged completely or partially within the area surrounded by the separating line. In the case of a division by two or more separating lines, the separating lines preferably run between the bases of the electrical heating region and between the collecting conductors.

A first base of the electrical heating region is arranged immediately adjacent the first base of the first pane and a second base of the electrical heating region is arranged immediately adjacent the second base of the first pane. Here, "immediately adjacent" means that the second base of the electrical heating region is arranged between the first base of the electrical heating region and the second base of the first pane and is not arranged between the first base of the electrical heating region and the first base of the pane.

In an advantageous embodiment of a pane according to the invention, the first base of the heating region is arranged substantially parallel to the first base of the first pane.

In another advantageous embodiment of a pane according to the invention, the length of the shorter of the two bases of the first pane corresponds to the length of the immediately adjacent base of the heating region plus the width r of an edge decoating, in other words: $l_{1/2}$ is approx. equal to $b_{1/2}+2$ r. This has the particular advantage that the pane can be electrically heated over as much of its surface as possible.

At least two, and, in particular, exactly two, collecting conductors provided for connection to a voltage source are connected to the electrically conductive coating in the electrical heating region such that upon application of a voltage between the collecting conductors, a current path for a heating current is formed and heats the heating region together with the associated part of the pane.

The collecting conductors have at least the length of the base of the heating region on which they are arranged. With a given ratio v of the lengths of the bases of the first pane, the ratio according to the invention of the length $b_1$ of the first base of the heating region to the length $b_2$ of the second base of the heating region $b_1:b_2$ is from v:0.99 to v:0.50.

The length of the respective base of the heating region is calculated along the direction of extension (i.e., the longer dimension) of the respective collecting conductor and, hence, along a possible curvature of the base.

In an advantageous embodiment of a pane according to the invention, the first pane and/or the electrical heating region has the shape of a symmetrical trapezoid. This enables achieving particularly advantageous and homogeneous heating power distribution.

In an advantageous embodiment of a pane according to the invention, the ratio of the length $b_1$ of the first base of the heating region to the length $b_2$ of the second base of the heating region not equal 1, in other words, the electrical heating region is not rectangular. Rectangular heating regions do, in fact, have homogeneous heating power distributions, but are visually more conspicuous than trapezoidal heating regions, which can be more easily visually integrated into the three-dimensional curvature of the pane.

In another advantageous embodiment of a pane according to the invention, the ratio of the length $b_1$ of the first base of the heating region to the length $b_2$ of the second base of the heating region $b_1:b_2$ is from v:0.99 to 0.99.

This is particularly advantageous in order to heat the side regions of the pane in the region of the longer of the two bases as extensively as possible and to nevertheless obtain a more homogeneous heating power distribution according to the invention.

In another advantageous embodiment of a pane according to the invention, the ratio of the length $b_1$ of the first base of the heating region to the length $b_2$ of the second base of the heating region $b_1:b_2$ it is from 1.01 to v:0.50.

This is particularly advantageous in order to achieve an improvement of the homogeneity of the heating power distribution when at least one decoated or coating-free region, for example, for forming a communication window, is arranged inside the electrical heating region, with the decoated or coating-free regions preferably arranged in the center of the pane.

This is also particularly advantageous when the distance $h_1$ between the collecting conductors in the center of the electrical heating region is greater than the distance $h_2$ between the collecting conductors on the outer edges of the electrical heating region. Of course, the decoated or coating-free regions can also be combined with a greater distance $h_1$ compared to $h_2$.

The width of the first and second collecting conductor is preferably from 2 mm to 30 mm, particularly preferably from 4 mm to 20 mm and, in particular, from 10 mm to 20 mm. Thinner collecting conductors result in excessively high electrical resistance and, hence, in excessively high heating of the collecting conductor during operation. Moreover, thinner collecting conductors can only be produced with difficulty using printing techniques such as screenprinting. Thicker collecting conductors require an undesirably high material usage. Moreover, they result in an excessively great and un-aesthetic restriction of the see-through region of the pane. The length of the collecting conductor is governed by the extent of the electrical heating region. With a collecting conductor, which is typically implemented in the form of a strip, the longer of its dimensions is referred to as length and the less long of its dimensions as width. If additional collecting conductors are to be present, these can be designed even thinner, preferably from 0.6 mm to 5 mm.

In an advantageous embodiment, the collecting conductor according to the invention is implemented as a printed-on and fired conductive structure. The printed-on collecting conductor preferably contains at least a metal, a metal alloy, a metal compound, and/or carbon, particularly preferably a noble metal and, in particular, silver. The printing paste preferably contains metallic particles, metal particles, and/or carbon and, in particular, noble metal particles such as silver particles. The electrical conductivity is preferably achieved by means of the electrically conductive particles. The particles can be situated in an organic and/or inorganic matrix such as pastes or inks, preferably as a printing paste with glass frits.

The layer thickness of the printed-on collecting conductor is preferably from 5 μm to 40 μm, particularly preferably from 8 μm to 20 μm and most particularly preferably from 8 μm to 12 μm. Printed-on collecting conductors with these thicknesses are technically simple to realize and have advantageous current carrying capacity.

The specific resistance $\rho_a$ of the collecting conductors is preferably from 0.8 μohm·cm to 7.0 μohm·cm and particularly preferably from 1.0 μohm·cm to 2.5 μohm·cm. Collecting conductors with specific resistances in this range are technically simple to realize and have advantageous current carrying capacity.

Alternatively, however, the collecting conductor can also be implemented as a strip of an electrically conductive foil. In that case, the collecting conductor contains, for example, at least aluminum, copper, tinned copper, gold, silver, zinc, tungsten, and/or tin or alloys thereof. The strip preferably has a thickness of 10 µm to 500 µm, particularly preferably of 30 µm to 300 µm. Collecting conductors made of electrically conductive foils with these thicknesses are technically simple to realize and have advantageous current carrying capacity. The strip can be electrically conductively connected to the electrically conductive structure, for example, via a soldering compound, via an electrically conductive adhesive, or by direct placement.

The pane according to the invention includes a first pane, on which an electrically conductive coating is arranged. Depending on the material of the electrically conductive coating, it can be advantageous to protect the coating with a protective coating, for example, a varnish, a polymeric film, and/or a second pane.

In an advantageous embodiment of the pane according to the invention, the surface of the first pane, on which the electrically conductive coating is arranged is areally bonded to a second pane via a thermoplastic intermediate layer. Alternatively, the electrically conductive coating can be arranged on the first pane, in that is applied on a carrier film, for example, a polyethylene terephthalate (PET) film and this is bonded to the first pane via an intermediate layer, for example, a polyvinyl butyral (PVB) film.

All electrically insulating substrates that are thermally and chemically stable as well as dimensionally stable under the conditions of the production and use of the pane according to the invention are, in principle, suitable as the first and, optionally, the second pane.

The first pane and/or the second pane preferably contain glass, particularly preferably flat glass, float glass, quartz glass, borosilicate glass, soda lime glass, or clear plastics, preferably rigid clear plastics, in particular, polyethylene, polypropylene, polycarbonate, polymethylmethacrylate, polystyrene, polyamide, polyester, polyvinylchloride, and/or mixtures thereof. The first pane and/or the second pane are preferably transparent, in particular, for the use of the pane as the windshield or rear window of a motor vehicle or other uses wherein high light transmittance is desired. In the context of the invention, "transparent" means a pane that has transmittance greater than 70% in the visible spectral range. For panes, that are not located within the traffic-relevant field of vision of the driver, for example, for roof panels, the transmittance can, however, also be much lower, for example, greater than 5%.

The thickness of the pane can vary widely and thus be eminently adapted to the requirements of the individual case. Preferably, panes with the standard thicknesses from 1.0 mm to 25 mm, preferably from 1.4 mm to 2.5 mm are used for motor vehicle glass and preferably from 4 mm to 25 mm for furniture, appliances, and buildings, in particular, for electrical heaters. The size of the pane can vary widely and is governed by the size of the use according to the invention. The first pane and, optionally, the second pane have, for example, in the motor vehicle industry and the architecture sector, customary areas from 200 cm$^2$ up to 20 m$^2$.

The pane can have any three-dimensional shape. Preferably, the three-dimensional shape has no shadows zones such that it can, for example, be coated by cathodic sputtering. Preferably, the substrates are planar or slightly or greatly bent in a plurality of spatial directions. In particular, planar substrates are used. The panes can be colorless or colored.

Multiple panes are bonded to one another via at least one intermediate layer. The intermediate layer preferably contains at least one thermoplastic plastic, preferably polyvinyl butyral (PVB), ethylene vinyl acetate (EVA) and/or polyethylene terephthalate (PET). However, the thermoplastic intermediate layer can also contain, for example, polyurethane (PU), polypropylene (PP), polyacrylate, polyethylene (PE), polycarbonate (PC), polymethylmethacrylate, polyvinylchloride, polyacetate resin, casting resins, acrylates, fluorinated ethylene propylene, polyvinyl fluoride, and/or ethylene tetrafluoroethylene, or copolymers or mixtures thereof. The thermoplastic intermediate layer can be implemented by one or even by a plurality of thermoplastic films arranged one over another, wherein the thickness of a thermoplastic film is preferably from 0.25 mm to 1 mm, typically 0.38 mm or 0.76 mm.

In a composite pane according to the invention comprising a first pane, a first intermediate layer, and a second pane, the electrically conductive coating can be applied directly on the first pane or on a carrier film or on the intermediate layer itself. The first pane and the second pane have in each case an inside surface and an outside surface. The inside surfaces of the first and of the second pane are turned toward one another and bonded to one another via the thermoplastic intermediate layer. The outside surfaces of the first and of the second pane are turned away from one another and from the thermoplastic intermediate layer. The electrically conductive coating is applied on the inside surface of the first pane. Of course, another electrically conductive coating can also be applied on the inside surface of the second pane. The outside surfaces of the pane can also have coatings. The terms "first pane" and "second pane" are selected to distinguish between the two panes in a composite pane according to the invention. No statement as to the geometric arrangement is associated with the terms. If the pane according to the invention is, for example, provided in an opening, for example, of a motor vehicle or building, to separate the interior from the external environment, the first pane can be turned toward the interior or toward the outside environment.

Electrically conductive coatings according to the invention are known, for example, from DE 20 2008 017 611 U1, EP 0 847 965 B1, or WO2012/052315 A1. They typically contain one or a plurality, for example, two, three, or four electrically conductive, functional layers. The functional layers preferably include at least one metal, for example, silver, gold, copper, nickel, and/or chromium, or a metal alloy. The functional layers particularly preferably contain at least 90 wt.-% of the metal, in particular, at least 99.9 wt.-% of the metal. The functional layers can be made of the metal or the metal alloy. The functional layers particularly preferably contain silver or a silver-containing alloy. Such functional layers have particularly advantageous electrical conductivity with, at the same time, high transmittance in the visible spectral range. The thickness of a functional layer is preferably from 5 nm to 50 nm, particularly preferably from 8 nm to 25 nm. In this range for the thickness of the functional layer, advantageously high transmittance in the visible spectral range and particularly advantageous electrical conductivity are obtained.

Typically, at least one dielectric layer is arranged in each case between two adjacent functional layers of the electrically conductive coating. Preferably, another dielectric layer is arranged below the first and/or above the last functional layer. A dielectric layer contains at least one individual layer made of a dielectric material, for example, containing a nitride such as silicon nitride or an oxide such as aluminum oxide. However, dielectric layers can also include a plurality of individual layers, for example, individual layers of a dielectric material, smoothing layers, matching layers, blocker layers, and/or antireflection layers. The thickness of a dielectric layer is, for example, from 10 nm to 200 nm.

This layer structure is obtained, generally, by a sequence of deposition procedures that are performed by a vacuum method such as magnetic field enhanced cathodic sputtering.

Other suitable electrically conductive coatings preferably contain indium tin oxide (ITO), fluorine-doped tin oxide ($SnO_2$:F), or aluminum-doped zinc oxide (ZnO:Al).

The electrically conductive coating can, in principle, be any coating that is intended to be electrically contacted. If the pane according to the invention is intended to enable the vision through it, as is the case, for example, for panes in the window sector, the electrically conductive coating is preferably transparent. The electrically conductive coating according to the invention is preferably transparent to electromagnetic radiation, particularly preferably to electromagnetic radiation of a wavelength from 300 to 1,300 nm and in particular to visible light.

In an advantageous embodiment, the electrically conductive coating is a layer or a layer structure of a plurality of individual layers with a total thickness less than or equal to 2 μm, particularly preferably less than or equal to 1 μm.

One advantageous electrically conductive coating according to the invention has a sheet resistance of 0.4 ohm/square to 10 ohm/square. In a particularly preferred embodiment, the electrically conductive coating according to the invention has a sheet resistance of 0.5 ohm/square to 1 ohm/square. Coatings with such sheet resistances are particularly suitable for heating motor vehicle panes with typical onboard voltages of 12 V to 48 V or in the case of electric vehicles, with typical onboard voltages of up to 500 V.

The electrically conductive coating can extend over the entire surface of the first pane. Alternatively, however, the electrical heating layer can also extend only over a part of the surface of the first pane. The electrical heating layer preferably extends over at least 50%, particularly preferably over at least 70%, and most particularly preferably over at least 90% of the inside surface of the first pane.

The electrically conductive coating can have, in the electrical heating region and/or outside the electrical heating region, one or a plurality of uncoated, decoated, or coating-free regions. These regions can have particularly high transmittance for electromagnetic radiation, for example, infrared radiation or radar waves, and are known, for example, as data transmission windows or communication windows.

In an advantageous embodiment of a pane according to the invention as a composite pane, the inside surface of the first pane has a peripheral edge region with a width r of 2 mm to 50 mm, preferably of 5 mm to 20 mm that is not provided with the electrically conductive coating. The electrically conductive coating then has no contact with the atmosphere and, in the interior of the pane, is advantageously protected by the thermoplastic intermediate layer against damage and corrosion.

The collecting conductors are electrically contacted by one or a plurality of supply lines. The supply line is preferably implemented as a flexible foil conductor (flat conductor, flat-band conductor). This means an electrical conductor whose width is greater than its thickness. One such foil conductor is, for example, a strip or band containing or made of copper, tinned copper, aluminum, silver, gold, or alloys thereof. The foil conductor has, for example, a width of 2 mm to 16 mm and a thickness of 0.03 mm to 0.1 mm. The foil conductor can have an insulating, preferably polymeric sheathing, for example, on a polyimide basis. Foil conductors that are suitable for contacting electrically conductive coatings in panes have a total thickness, for example, of only 0.3 mm. Such thin foil conductors can be embedded without difficulty between the individual panes in the thermoplastic intermediate layer. Multiple conductive layers electrically isolated from one another can be situated in one foil conductor strip.

Alternatively, thin metal wires can also be used as an electrical supply line. The metal wires contain, in particular, copper, tungsten, gold, silver, or aluminum or alloys of at least two of these metals. The alloys can also contain molybdenum, rhenium, osmium, iridium, palladium, or platinum.

In an advantageous embodiment of the invention, the electrical supply line is connected to a contact band, for example, using a solder compound or an electrically conductive adhesive. The contact band is then connected to the collecting conductors. In the context of the invention, the contact band is an extension of the supply line such that the connection surface between the contact band and the collecting conductor means the contact surface according to the invention from which the distance a runs in the long direction of the collecting conductor.

The contact band advantageously increases the current carrying capacity of the collecting conductor. Moreover, undesirable heating of the contact point between the collecting conductor and the supply line can be reduced by the contact band. In addition, the contact band simplifies the electrical contacting of the collecting conductor by the electrical supply line, since the supply line does not have to be connected, for example, soldered, to the collecting conductor already applied.

The contact band preferably includes at least one metal, particularly preferably copper, tinned copper, silver, gold, aluminum, zinc, tungsten, and/or tin. This is particularly advantageous with regard to the electrical conductivity of the contact band. The contact band can also include alloys, which preferably contains one or a plurality of the elements mentioned and, optionally, other elements, for example, brass or bronze.

The contact band is preferably implemented as a strip of a thin, electrically conductive foil. The thickness of the contact band is preferably from 10 μm to 500 μm, particularly preferably from 15 μm to 200 μm, most particularly preferably from 50 μm to 100 μm. Foils with these thicknesses are technically simple to produce and readily available and have, in addition, advantageously low electrical resistance.

The length of the contact band is preferably from 10 mm to 400 mm, particularly preferably from 10 mm to 100 mm and, in particular, 20 mm to 60 mm. This is particularly advantageous with regard to good handling of the contact band and with regard to a sufficiently large contact surface between the collecting conductor and the contact band for making the electrical contact.

The width of the contact band is preferably from 2 mm to 40 mm, particularly preferably from 5 mm to 30 mm, this is particularly advantageous with regard to the contact surface between the contact band and the collecting conductor and simple connection of the contact band to the electrical supply line. The expressions "length" and "width" of the contact band designate in each case the dimension in the same direction of expansion by which the length or width of the collecting conductor is indicated.

In a preferred embodiment, the contact band is in direct full-surface contact with the collecting rail. For this purpose, a contact band is placed on the collecting conductor. The particular advantage resides in simple production of the pane and utilization of the entire surface of the contact band as a contact surface.

The contact band can simply be placed on the collecting conductor and is durably stably fixed in the intended position inside the laminated pane.

The invention further includes a method for producing a pane with an electrical heating region, comprising at least:
(a) preparing a substantially trapezoidal first pane with a surface III, a first base with length $l_1$, a second base with length $l_2$, and a ratio v of the lengths of the bases of $v=l_1:l_2$ from 0.70:1 to 0.98:1,
(b) applying an electrically conductive coating on at least one part of the surface III of a first pane,
(c) electrical division of at least one substantially trapezoidal electrical heating region by at least one separating line from the electrically conductive coating and arranging a first base of the heating region immediately adjacent the first base of the first pane and a second base of the heating region immediately adjacent the second base of the first pane, wherein the ratio of the length $b_1$ of the first base of the heating region to the length $b_2$ of the second base of the heating region, with a given ratio v, is set to $b_1:b_2$ from v:0.99 to v:0.50,
(d) applying at least two collecting conductors provided for connection to a voltage source, which are connected to the electrically conductive coating in the electrical heating region such that a current path for a heating current is formed between the collecting conductors.

The application of the electrically conductive coating in process step (b) can be done by a method known per se, preferably by magnetic field enhanced cathodic sputtering. This is particularly advantageous with regard to simple, fast, economical, and uniform coating of the first pane. The electrically conductive coating can, however, also be applied, for example, by vapor deposition, chemical vapor deposition (CVD), plasma enhanced chemical vapor deposition (PECVD), or by wet chemical methods.

The first pane can be subjected to a temperature treatment after process step (a) or (b). Here, the first pane with the electrically conductive coating is heated to a temperature of at least 200° C., preferably at least 300° C. The temperature treatment can serve to increase the transmittance and/or to reduce the sheet resistance of the electrically conductive coating.

The first pane can be bent after process step (b), typically at a temperature of 500° C. to 700° C. Since it is technically simpler to coat a flat pane, this approach is advantageous when the first pane is to be bent. Alternatively, however, the first pane can also be bent before process step (b), for example, when the electrically conductive coating is not suitable to withstand a bending process without damage.

The application of the collecting conductor in process step (d) is preferably done by printing-on and firing an electrically conductive paste in a screenprinting process or in an inkjet process. Alternatively, the collecting conductor can be applied on the electrically conductive coating as a strip of an electrically conductive foil, preferably positioned, soldered, or adhesively bonded.

In screenprinting methods, the lateral shaping is done by masking the fabric through which the printing paste with the metal particles is pressed. By means of suitable shaping of the masking, the width of the collecting conductor can, for example, be particularly simply specified and varied.

The decoating of individual separating lines in the electrically conductive coating in process step (c) is preferably done using a laser beam. Methods for patterning thin metal films are known, for example, from EP 2 200 097 A1 or EP 2 139 049 A1. The width of the decoating is preferably 10 µm to 1000 µm, particularly preferably 30 µm to 200 µm and in particular 70 µm to 140 µm. In this range, particularly clean, residue-free decoating by the laser beam occurs. The decoating by laser beam is particularly advantageous since the decoated lines are optically very inconspicuous and impair the appearance and vision through the pane only a little. The decoating of a line with a width that is wider than the width of a laser cut is done by multiple passes along the line with the laser beam. Consequently, the process duration and costs increase with increasing line width. Alternatively, the decoating can be done by mechanical removal as well as by chemical or physical etching.

An advantageous improvement of the method according to the invention comprises at least the following additional steps:
(e) arranging a thermoplastic intermediate layer on the coated surface of the first pane and arranging a second pane on the thermoplastic intermediate layer and
(f) bonding the first pane and the second pane via the thermoplastic intermediate layer.

In process step (e), the first pane is preferably arranged such that the one of its surfaces that is provided with the electrically conductive coating is turned toward the thermoplastic intermediate layer. The surface thus becomes the inside surface of the first pane and the electrically conductive coating is hermetically enclosed and protected.

The thermoplastic intermediate layer can be formed by a single thermoplastic film or even by two or more thermoplastic films that are arranged areally one above another.

The bonding of the first and second pane in process step (f) is preferably done under the action of heat, vacuum, and/or pressure. Methods known per se can be used for producing a pane.

So-called autoclave methods can, for example, be performed at an elevated pressure of roughly 10 bar to 15 bar and temperatures from 130° C. to 145° C. over roughly 2 hours. Vacuum bag or vacuum ring methods known per se operate, for example, at roughly 200 mbar and 80° C. to 110° C. The first pane, the thermoplastic intermediate layer, and the second pane can also be pressed in a calender between at least one pair of rollers to form a pane. Systems of this type are known for producing panes and normally have at least one heating tunnel upstream from a pressing plant. The temperature during the pressing procedure is, for example, from 40° C. to 150° C. Combinations of calender and autoclave methods have, in particular, proven their value in practice. Alternatively, vacuum laminators can be used. These consist of one or a plurality of heatable, evacuable chambers in which the first pane and the second pane are laminated within, for example, roughly 60 minutes at reduced pressures of 0.01 mbar to 800 mbar and temperatures of 80° C. to 170° C.

The invention further includes the use of the pane according to the invention with electrical contacting in buildings, in particular in the entrance area, window area, roof area, or façade area, as a built-in component in furniture and appliances, in means of transportation for travel on land, in the air, or on water, in particular in trains, watercraft and motor vehicles, for example, as a windshield, rear window, side window, and/or roof panel.

In the following, the invention is explained in detail with reference to drawings and exemplary embodiments. The drawings are schematic representations and not true to scale. The drawings in no way restrict the invention.

Figure 1B:
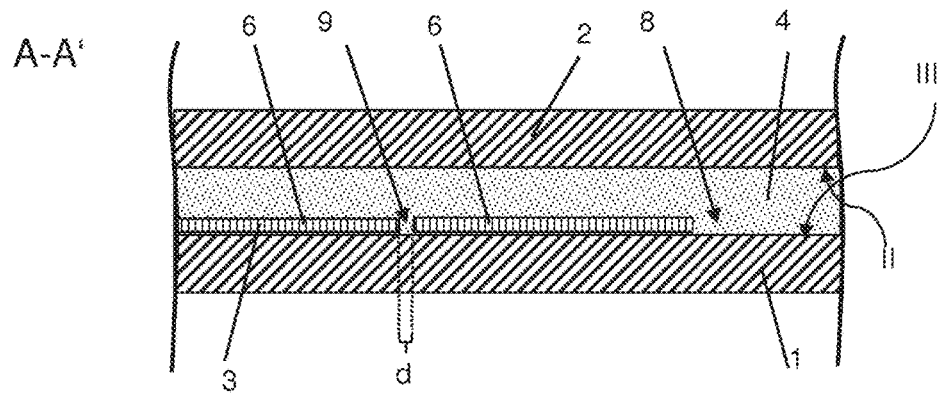
Figure 2A:
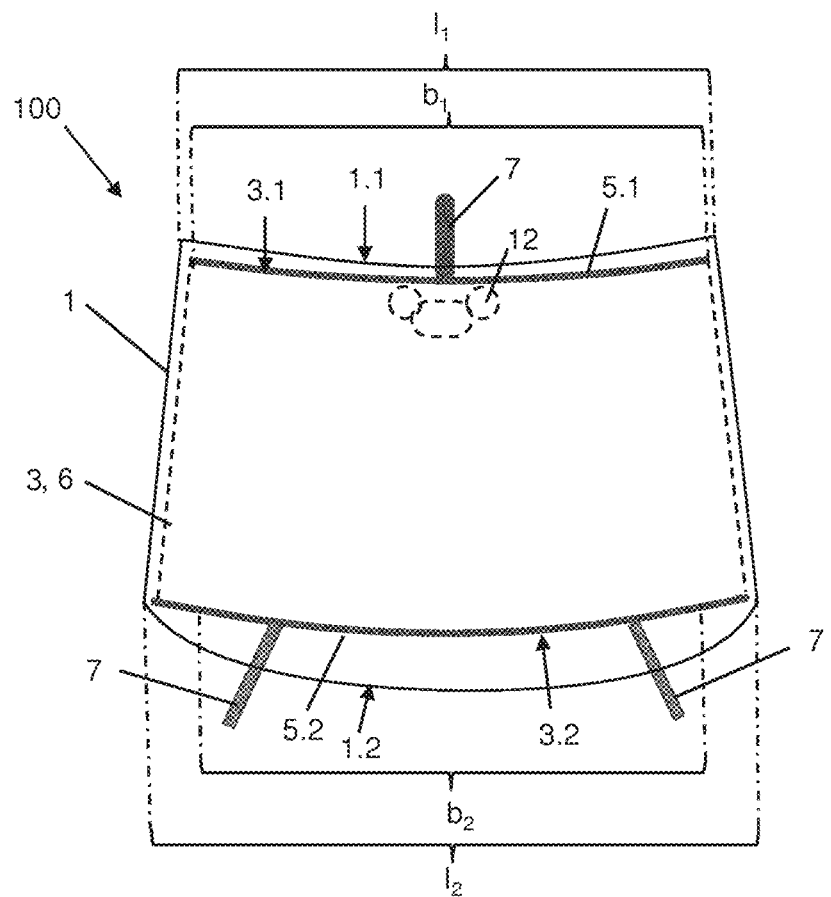
Figure 2B:
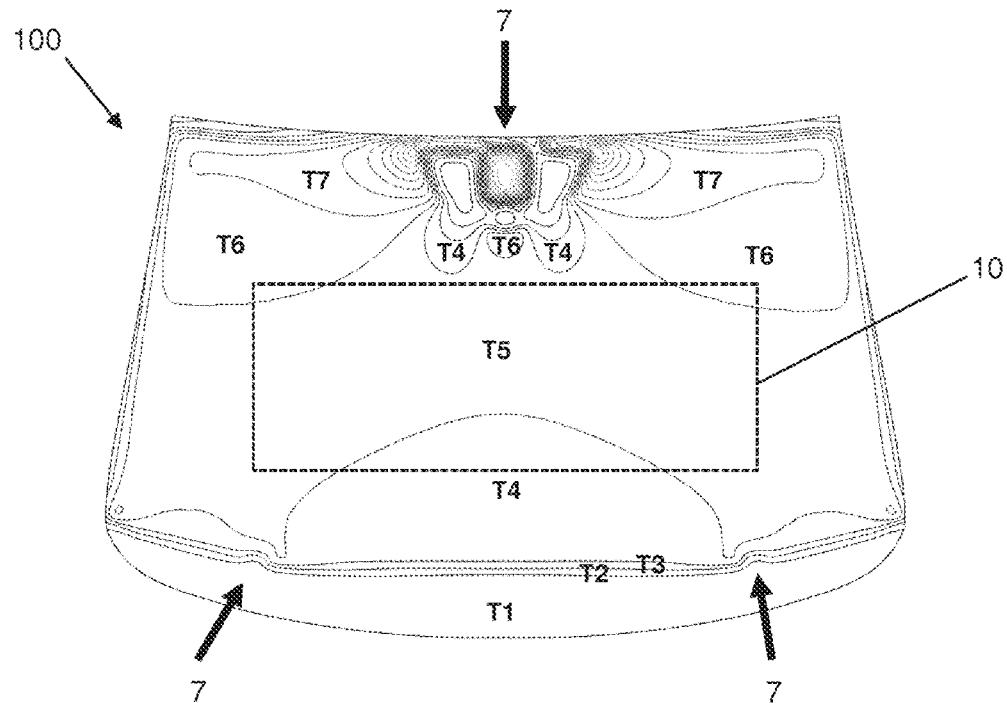
Figure 3A:
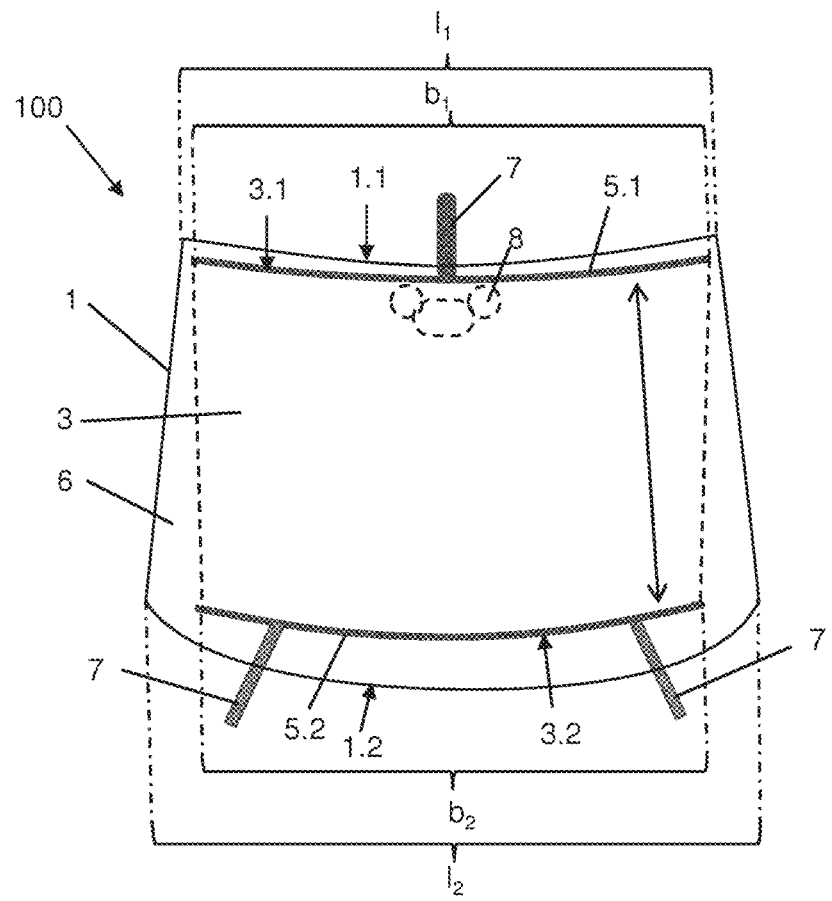
Figure 3B:
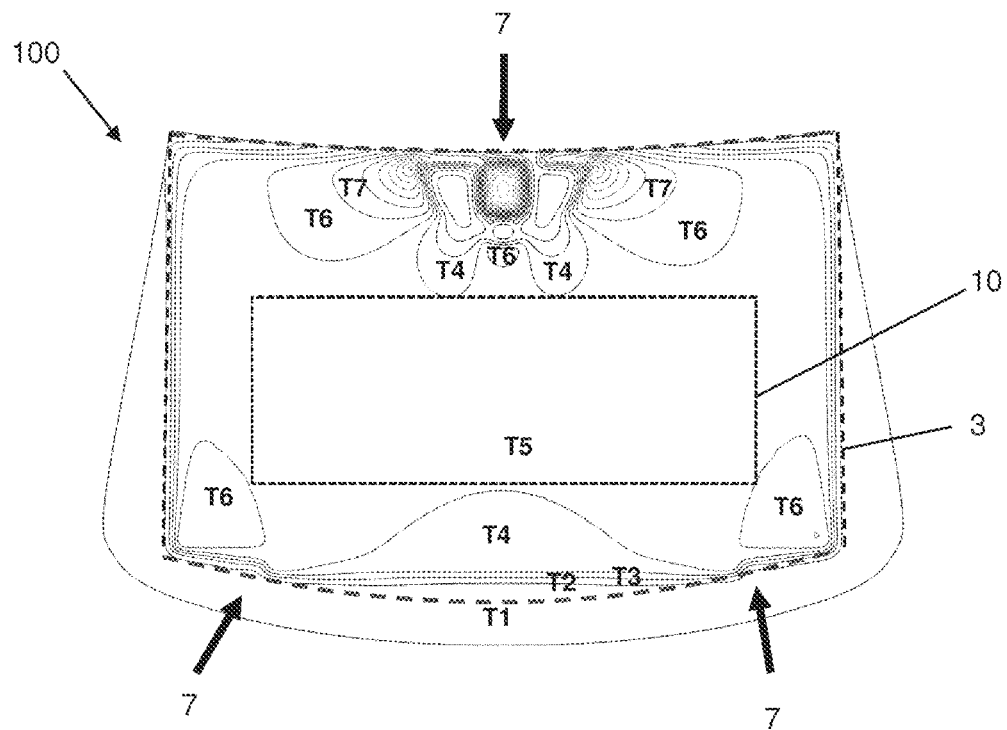
Figure 4:
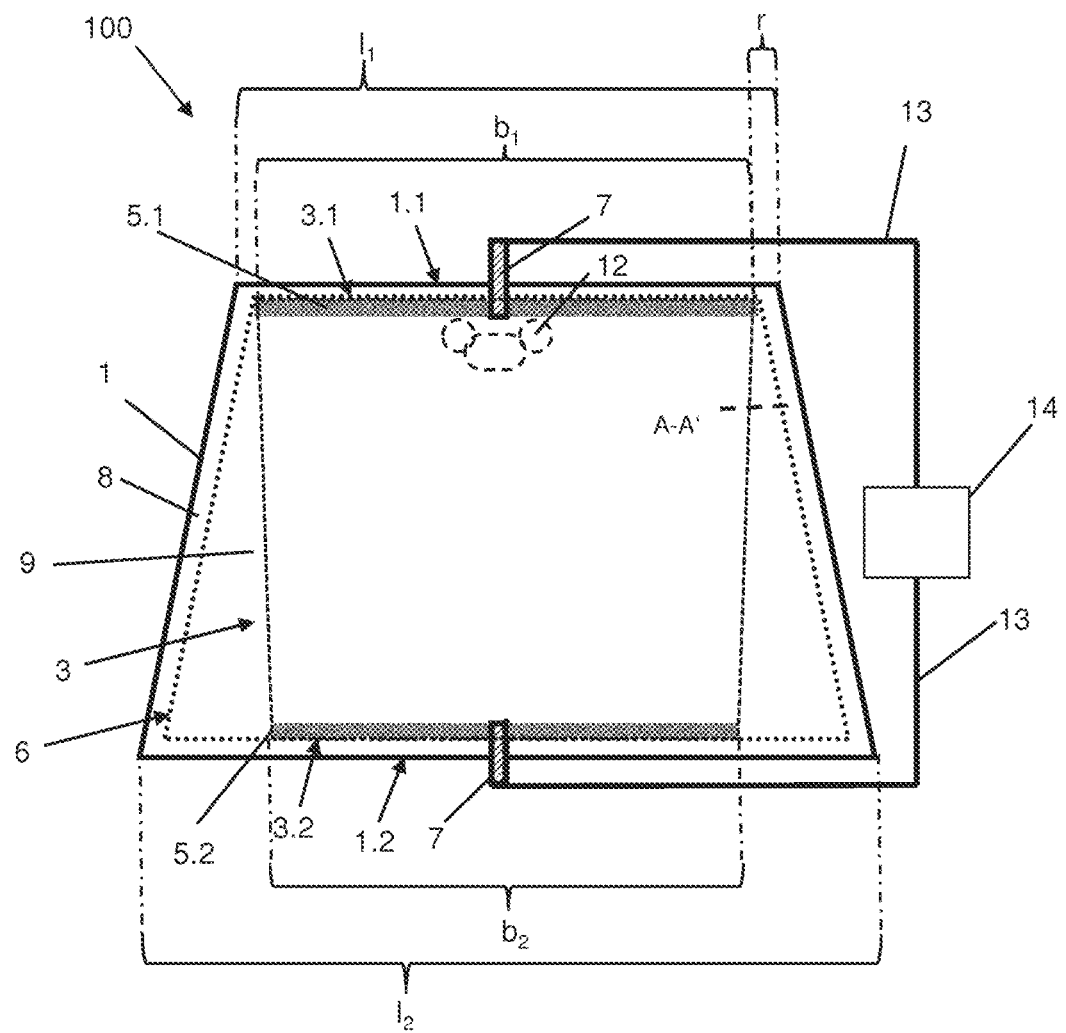
Figure 5:
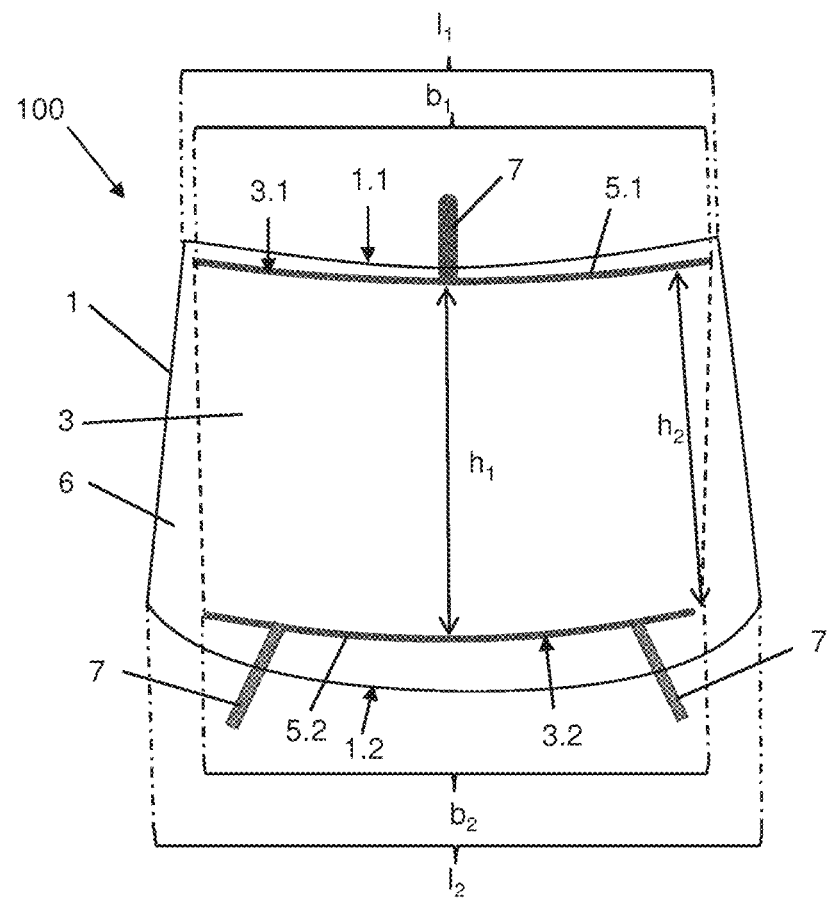
Figure 6:
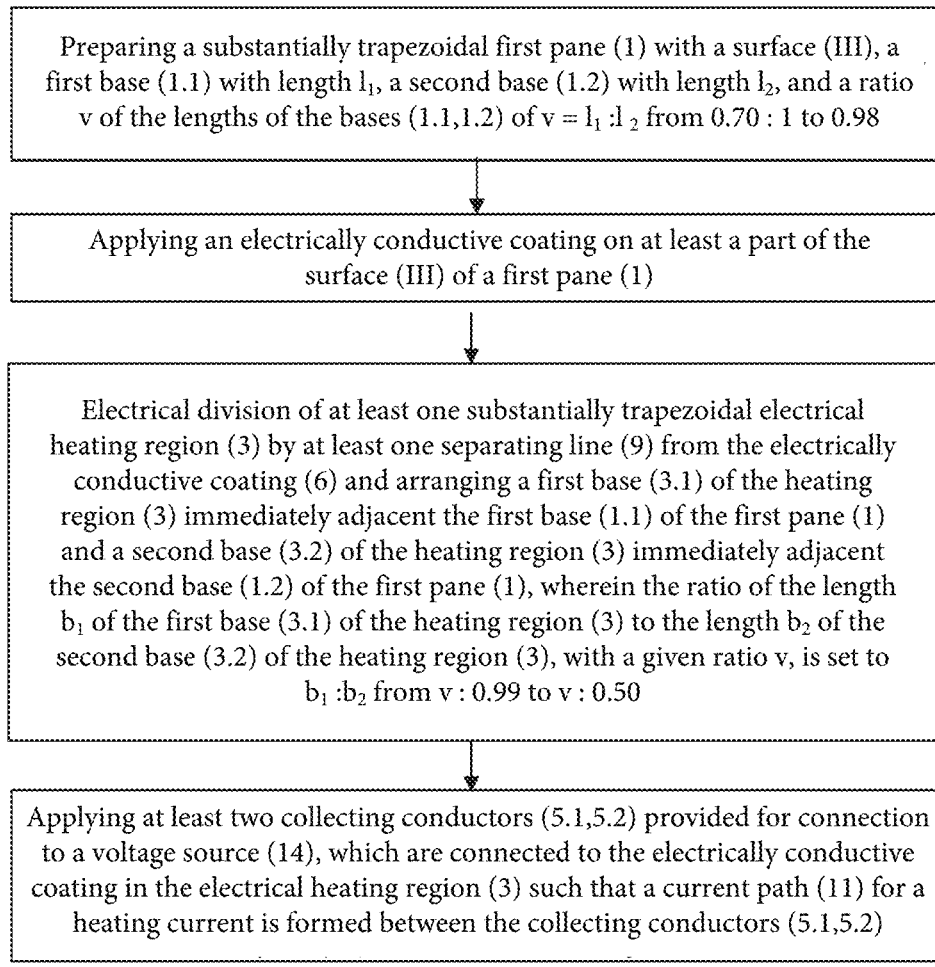

They depict:

FIG. 1A a top plan view of an embodiment of a pane according to the invention with an electrical heating layer, FIG. 1B a cross-sectional view along the section line A-A' through the pane of FIG. 1A, FIG. 2A a top plan view of a prior art pane as a comparative example, FIG. 2B simulation of the temperature distribution of the comparative example of FIG. 2A, FIG. 3A a top plan view of another embodiment of a pane according to the invention, FIG. 3B simulation of the temperature distribution of the pane according to the invention of FIG. 3A, FIG. 4 a top plan view of another embodiment of a pane according to the invention, FIG. 5 a top plan view of another embodiment of a pane according to the invention, and FIG. 6 a detailed flowchart of an embodiment of the method according to the invention.

FIG. 1A depicts a top plan view of an exemplary embodiment of a pane 100 according to the invention with an electrical heating region 3. FIG. 1B depicts a cross-section through the pane 100 according to the invention of FIG. 1A along the section line A-A'. The pane 100 comprises a first pane 1 and a second pane 2, which are bonded to one another via a thermoplastic intermediate layer 4. The pane 100 is, for example, a motor vehicle pane and, in particular, the windshield of a passenger car. The first pane 1 is, for example, intended to be turned toward the interior in the installed position. The first pane 1 and the second pane 2 are made of soda lime glass. The thickness of the first pane 1 is, for example, 1.6 mm and the thickness of the second pane 2 is 2.1 mm. The thermoplastic intermediate layer 4 is made of polyvinyl butyral (PVB) and has a thickness of 0.76 mm. An electrically conductive coating 6 is applied on the inside surface Ill of the first pane 1. The electrically conductive coating 6 is a layer system that contains, for example, three electrically conductive silver layers that are separated from one another by dielectric layers. When a current flows through the electrically conductive coating 6 in the electrical heating region 3, it is heated as a result of its electrical resistance and Joule heating. The electrically conductive coating 6 can, consequently, be used for active heating of the pane 100.

The electrically conductive coating 6 extends, for example, over the entire surface Ill of the first pane 1 minus a peripheral frame-like uncoated region, the so-called edge decoating 8, with a width r of 10 mm. The edge decoating 8 serves for the electrical insulation between the voltage carrying electrically conductive coating 6 and the motor vehicle body. The region of the edge decoating 8 is hermetically sealed by adhesive bonding to the intermediate layer 4 in order to protect the electrically conductive coating 6 against damage and corrosion.

For the electrical contacting, in each case, a first collecting conductor 5.1 is arranged in the upper edge region of the pane 100 and another, second collecting conductor 5.2 is arranged in the lower edge region on the electrically conductive coating 6 in the electrical heating region 3. The collecting conductors 5.1, 5.2 contain, for example, silver particles and were applied in the screenprinting method and subsequently fired. The collecting conductors 5.1, 5.2 have, in the example depicted, a constant thickness of, for example, roughly 10 μm and a constant specific resistance of, for example, 2.3 μohm·cm.

The electrical heating region 3 is electrically divided by a separating line 9 with a trapezoidal contour from the electrically conductive coating 6. This means that the separating line 9 galvanically isolates the electrically conductive coating 6 in the electrical heating region 3 from the electrically conductive coating 6. The collecting conductor 5.1 arranged on the first base 3.1 of the electrical heating region 3 has, for example, the length $b_1$ of the first base 3.1 of the electrical heating region 3, and the collecting conductor 5.2 arranged on the lower, second base 3.2 of the electrical heating region 3 has, here, for example, the length $b_2$ of the second base 3.2 of the electrical heating region 3.

In the exemplary embodiment depicted, the length $l_1$ of the first base 1.1 of the first pane 1 is, for example, 900 mm and the length $l_2$ of the second base 1.2 is, for example, 1000 mm. The ratio v of the length $l_1:l_2$ is thus v=900 mm:1000 mm=0.90:1=0.90.

In this example, the separating line 9 was selected such that the length $b_1$ of the first base 3.1 of the electrical heating region 3 is $b_1$=880 mm here. In other words, the length $b_1$ of the first base 3.1 of the electrical heating region 3 plus the width of a left and a right edge decoating of a total of 2×10 mm=20 mm corresponds to the length $l_1$ of the shorter of the two bases of the first pane 1, in other words, $l_1=b_1+2×10$ mm.

The length $b_2$ of the second base 3.2 of the electrical heating region 3 is, in this example, $b_2$=910 mm. Thus, the ratio of $b_1:b_2$=880 mm:910 mm=0.97.

The length $b_2$ of the second base 3.2 of the electrical heating region 3 was accordingly selected such that the ratio of the length $b_1:b_2$ with 0.97 falls within the range of v:0.99 (=0.90:0.99=0.91) to v:0.50 (=0.90:0.50=1.8). The ratio of the lengths $b_1:b_2$ is, at 0.97, actually in a preferred range according to the invention of v:0.99 (=0.90:0.99=0.91) to 0.99.

When an electrical voltage is applied on the collecting conductors 5.1, 5.2, a uniform current flows along a current path 11 through the electrically conductive coating 6 in the electrical heating region 3 between the collecting conductors 5.1, 5.2. Here, for example, a supply line 7 is arranged approx. centrally on each collecting conductor 5.1, 5.2. The supply line 7 is a foil conductor known per se. The supply line 7 is electrically conductively connected to the collecting conductor 5.1, 5.2 via a contact surface, for example, by means of a soldering compound, an electrically conductive adhesive, or by simple placement and pressure inside the pane 100. The foil conductor contains, for example, a tinned copper foil with a width of 10 mm and a thickness of 0.3 mm. Via the electrical supply lines 7, the collecting conductors 5.1, 5.2 are connected via connection cable 13 to a voltage source 14 which provides an onboard voltage customary for motor vehicles, preferably from 12 V to 15 V and, for example, roughly 14 V. Alternatively, the voltage source 14 can also have higher voltages, for example, from 35 V to 45 V and, in particular, 42 V.

By means of the selection of the ratio according to the invention of $b_1:b_2$ at 0.97, it was possible to obtain a significant improvement of the homogeneity of the heating power distribution in the electrical heating region 3, compared to a prior art pane, in which the entire electrically conductive coating 6 is heated.

FIG. 1B schematically depicts a cross-section through the pane 100 according to the invention along the section line A-A'. The separating line 9 has a width d of, for example, 100 μm and is introduced, for example, by laser patterning into the electrically conductive coating 6. Separating lines 9 with such a low width are hardly perceptible visually and disrupt vision through the pane 100 only a little, which is, particularly for an application in motor vehicles, of special importance for driving safety.

By means of an opaque color layer known per se as a blockout print, it is possible to prevent the region of the collecting conductors 5.1, 5.2 from being visible to an observer. The blockout print (not shown here) can, for example, be applied frame-like on the inside surface II of the second pane 2.

FIG. 2A depicts a prior art pane 100. The pane 100 comprises a first pane 1 and a second pane 2, which are bonded to one another via a thermoplastic intermediate layer 4. The pane 100 is, for example, a motor vehicle pane and, in particular, the windshield of a passenger car. The first pane 1 is, for example, intended to be turned toward the interior in the installed position. The first pane 1 and the second pane 2 are made of soda lime glass. The thickness of the first pane 1 is, for example, 1.6 mm and the thickness of the second pane 2 is 2.1 mm. The thermoplastic intermediate layer 4 is made of polyvinyl butyral (PVB) and has a thickness of 0.76 mm. An electrically conductive coating 6 that corresponds in structure to the electrically conductive coating 6 of FIG. 1A is applied on the inside surface III of the first pane 1. In contrast to FIG. 1A, the second collecting conductor 5.2 arranged at the lower edge of the pane 100 in FIG. 2A has two supply lines 7 instead of only one supply line.

Moreover, the prior art pane 100 of FIG. 2A differs from the pane 100 according to the invention of FIG. 1A in that no separating lines 9 are introduced in the electrically conductive coating 6; and, consequently, the electrical heating region 3 corresponds to the entire area of the electrically conductive coating 6.

In the prior art comparative example depicted, the length $l_1$ of the first base 1.1 of the first pane 1 is, for example, 1220 mm and the length $l_2$ of the second base 1.2 is, for example, 1440 mm. The ratio v of the lengths $l_1:l_2$ is thus v=1220 mm:1440 mm=0.85:1=0.85.

In the prior art comparative example, the electrical heating region 3 corresponds to the entire area of the electrically conductive coating 6, since no division by a separating line is present. The length $b_1$ of the first base 3.1 of the electrical heating region 3 is, consequently, $b_1$=1200 mm and the length $b_2$ of the second base 3.2 of the electrical heating region 3 is $b_2$=1420 mm, with a width of an edge decoating 8 of r=10 mm. Thus, the ratio is $b_1:b_2$=1200 mm:1420 mm=0.85. Thus, the ratio of the lengths $b_1:b_2$, at 0.85 is outside the range according to the invention of v:0.99 (=0.85:0.99=0.86) to v:0.50 (=0.85:0.50=1.69).

In the comparative example depicted, the electrical heating layer 3 has, in the upper third of the pane and roughly central to the width of the pane, three coating-free regions 12, which can serve as communication windows.

The pane has, on the upper edge, a first collecting conductor 5.1. The current is fed through a supply line 7 into this first collecting conductor 5.1. The current flows through the electrical heating region 3 into a second collecting conductor 5.2, which is arranged in the lower region of the pane 100. The second collecting conductor 5.2 is connected at its right and its left end to one supply line 7 in each case. The collecting conductors 5.1, 5.2 have, for example, a width of 16 mm and a thickness of 10 μm. The electrically conductive coating 6 has, for example, a sheet resistance of 0.9 ohm/square. For a finite element simulation, a voltage of 14 V between the lower supply line 7 and the upper supply line 7 and an ambient temperature of 22° C. were assumed. In addition, a heating time of 12 minutes was assumed in the simulation.

FIG. 2B depicts the simulation of the temperature distribution of the prior art comparative of FIG. 2A. The positions of the supply lines 7 are indicated by arrows. The temperature distribution is nonuniform, in particular in the critical central field of vision 10. At the lower edge of the central field of vision 10, the pane 100 according to the comparative example has only a low temperature of T4=30.0° C. to 32.5° C. In the upper left and right corners, the temperature is, in contrast, in the range from T6=35.0° C. to 37.5° C. For a quick and uniform deicing and defogging function, a more uniform temperature distribution is necessary.

FIG. 3A depicts a top plan view of another embodiment of a pane 100 according to the invention. The first pane 1, the second pane 2, the electrically conductive coating 6, the thermoplastic intermediate layer 4, and the outer supply lines 7 are configured as in FIG. 2A. The essential difference relative to the prior art comparative example of FIG. 2A is that by means of a separating line 9 an electrical heating region 3 is separated from the electrically conductive coating 6. This separating line 9 limits the current flow from the first collecting conductor 5.1 to the opposing second collecting conductor 5.2. As the following simulation depicts, this makes it possible to obtain homogenization of the heating output distribution and the temperature distribution in the critical central field of vision 10 of the pane 100 according to the invention. The separating lines 9 were introduced into the electrical heating layer 3 by laser patterning. The width of the individual separating lines 9 is, for example, 100 μm, as a result of which the vision through the pane 100 and its visual appearance are only minimally affected.

In the exemplary embodiment depicted, the length $l_1$ of the first base 1.1 of the first pane 1 is, for example, 1220 mm and the length $l_2$ of the second base 1.2 is, for example, 1440 mm, corresponding to the comparative example of FIG. 2A. The ratio v of the lengths $l_1:l_2$ is thus v=1220 mm:1440 mm=0.85:1=0.85.

In this example, the separating line 9 was selected such that, here, the length $b_1$ of the first base 3.1 of the electrical heating region 3 is $b_1$=1200 mm. In other words, the length $b_1$ of the first base 3.1 of the electrical heating region 3 plus the width of a left and a right edge decoating of a total of 2×10 mm=20 mm corresponds to the length $l_1$ of the shorter of the two bases 3.1,3.2 of the first pane 1, i.e., $l_1=b_1+2\times10$ mm.

The length $b_2$ of the second base 3.2 of the electrical heating region 3 is, in this example, likewise $b_2$=1200 mm. Thus, the ratio of $b_1:b_2$=1200 mm:1200 mm=1.00.

The length $b_2$ of the second base 3.2 of the electrical heating region 3 was accordingly selected such that the ratio of the lengths $b_1:b_2$ at 1.00 lies within the range according to the invention from v:0.99 (=0.85:0.99=0.86) to v:0.50 (=0.85:0.50=1.69).

FIG. 3B depicts the stimulation of the temperature distribution of the pane 100 according to the invention of FIG. 3A. After 12 min., the entire central field of vision 10 has a uniform temperature distribution with a temperature of T5=32.5° C. to 35.0° C. In the case of weather-related icing or condensation, the complete central field of vision 10 would be completely freed of icing or condensation within a short time and unimpaired vision through the pane would be produced.

Table 1 summarizes the simulation results.

TABLE 1

| | Average specific heating power in the electrical heating region 3 | Minimum temperature in the central field of vision 10 | Temperature distribution in the central field of vision 10 |
|---|---|---|---|
| Comparative | 351.5 W/m² | 30.0° C.-32.5° C. | nonuniform |

TABLE 1-continued

| | Average specific heating power in the electrical heating region 3 | Minimum temperature in the central field of vision 10 | Temperature distribution in the central field of vision 10 |
|---|---|---|---|
| example of FIG. 2A (Prior Art) | | | and too little |
| Pane 100 according to the invention of FIG. 3A | 350.9 W/m² | 32.5° C.-35.0° C. | uniform and high |

The pane 100 according to the invention of FIG. 3A presents clearly improved heating properties compared to the prior art pane 100 of the comparative example of FIG. 2A. With virtually the same average specific heating power in the electrical heating region 3 of 351.5 W/m² of the comparative example compared to 350.9 W/m² of the pane 100 according to the invention of FIG. 3A, the pane 100 according to the invention of FIG. 3A has more uniform and higher heating of the important central field of vision 10 than the comparative example.

In particular, in the critical central field of vision 10, under the simulation conditions, the prior art pane has, on the lower edge, an extensive region with a temperature T4 from 30.0° C. to 32.5° C. and, in the upper left and right corners, a temperature from 35.0° C. to 37.5° C. This inhomogeneity results in an only unsatisfactory deicing and defogging function of the pane 100 in the central field of vision 10. The heating properties in the central field of vision 10 are insufficient to ensure quick, problem-free vision through the pane 100 under winter weather conditions.

The pane 100 according to the invention of FIG. 3A has, in the critical central field of vision 10, improved heating properties. Thus, after the same time of 12 min. as in the comparative example, simulations yielded uniform heating to an average temperature T5 from 32.5° C. to 35.0° C. over the entire central field of vision 10. By means of the small width of the separating lines 9, vision through the pane 100 according to the invention is only minimally impaired and satisfies the requirements for motor vehicle glazing.

This result was unexpected and surprising for the person skilled in the art.

FIG. 4 depicts a top plan view of another embodiment of a pane 100 according to the invention. The first pane 1 with the electrically conductive coating 6 corresponds in its structure and its dimensions to the pane 100 of FIG. 1A, wherein only the electrical heating region 3 is differently implemented by a different routing of the separating line 9. Moreover, the electrically conductive coating 6 has, in the electrical heating region 3, three coating-free regions 12, which are arranged in the upper region of the first pane 1 and roughly centrally relative to the bases 1.1,1.2.

In the exemplary embodiment depicted, the length $l_1$ of the first base 1.1 of the first pane 1 is, for example, 900 mm and the length $l_2$ of the second base 1.2 is, for example, 1000 mm, as already set forth in FIG. 1A. The ratio v of the lengths $l_1:l_2$ is thus v=900 mm:1000 mm=0.90:1=0.90.

In this example, the separating line 9 was selected such that, here, the length $b_1$ of the first base 3.1 of the electrical heating region 3 is $b_1$=880 mm. In other words, the length $b_1$ of the first base 3.1 of the electrical heating region 3 plus the width of a left and a right edge decoating 8 corresponds to a total of 2×10 mm=20 mm of the length $l_1$ of the shorter of the two bases of the first panel, i.e., $l_1=b_1+2\times10$ mm.

In contrast to FIG. 1A, the length $b_2$ of the second base 3.2 of the electrical heating region 3 in this example is $b_2$=800 mm. Thus, the ratio is $b_1:b_2$=880 mm:800 mm=1.10.

The length $b_2$ of the second base 3.2 of the electrical heating region 3 was accordingly selected such that the ratio of the lengths $b_1:b_2$ at 1.10 in the region according to the invention is from v:0.99 (=0.90:0.99=0.91) to v:0.50 (=0.90:0.50=1.8).

The ratio of the lengths $b_1:b_2$ at 1.10 actually falls within the preferred range according to the invention of 1.01 to v:0.50 (=0.90:0.50=1.80).

It has been demonstrated that this solution according to the invention results in particularly homogeneous heating power distributions in electrical heating regions 3 when these have coating-free regions 12.

FIG. 5 depicts a top plan view of another embodiment of a pane 100 according to the invention. The first pane 1 with the electrically conductive coating 6 corresponds in its structure and its dimensions to the pane of FIG. 3A, wherein only the electrical heating region 3 is differently implemented by a different routing of the separating line 9.

In the exemplary embodiment depicted, the distance $h_1$ between the collecting conductors 5.1, 5.2 in the center of the electrical heating region 3 is greater than the distance $h_2$ between the collecting conductors 5.1, 5.2 on the outer edges of the electrical heating region 3. The distance $h_1$ is, for example, 900 mm and the distance $h_2$ is 800 mm.

In the exemplary embodiment depicted, the length $l_1$ of the first base 1.1 of the first pane 1 is, for example, 1220 mm and the length $l_2$ of the second base 1.2 is, for example, 1440 mm, as in the comparative example of FIG. 3A. The ratio v of the lengths $l_1:l_2$ is thus v=1220 mm:1440 mm=0.85:1=0.85.

In this example, the separating line 9 was selected such that, here, the length $b_1$ of the first base 3.1 of the electrical heating region 3 is $b_1$=1200 mm. In other words, the length $b_1$ of the first base 3.1 of the electrical heating region 3 plus the width of a left and a right edge decoating corresponds to a total of 2×10 mm=20 mm of the length $l_1$ of the shorter of the two bases of the first pane 1, i.e., $l_1=b_1+2\times10$ mm.

The length $b_2$ of the second base 3.2 of the electrical heating region 3 is, in this example, $b_2$=1000 mm. Thus, the ratio of $b_1:b_2$=1200 mm:1000 mm=1.20.

The length $b_2$ of the second base 3.2 of the electrical heating region 3 was accordingly selected such that the ratio of the lengths $b_1:b_2$ at 1.20 is in the range according to the invention from v:0.99 (=0.85:0.99=0.86) to v:0.50 (=0.85:0.50=1.69). Thus, the ratio of the length $b_1:b_2$ at 1.2 actually falls within a preferred range according to the invention from 1.01 to v:0.50 (=0.85:0.50=1.69).

Such a ratio of the lengths $b_1:b_2$ within the preferred range according to the invention from 1.01 to v:0.50 is particularly advantageous in electrical heating regions 3, whose distance $h_1$ between the collecting conductors 5.1, 5.2 in the center of the electrical heating region 3 is greater than the distance $h_2$ between the collecting conductors 5.1, 5.2 on the outer edges of the electrical heating region 3. This yields a significantly more homogeneous heating power distribution and a more uniform temperature distribution upon application of a voltage than with prior art panes, in which $b_1:b_2$ is outside the range according to the invention.

FIG. 6 depicts a flowchart of an exemplary embodiment of the method according to the invention for producing an electrically heatable pane 100.

It was possible to demonstrate that panes 100 according to the invention with separating lines 9 have significantly improved heating properties, improved homogeneity of the heating power distribution and more uniform temperature distribution with higher temperatures in particularly important regions of the pane. At the same time, vision through the pane 100 is only minimally impaired by the separating lines 9 according to the invention.

This result was unexpected and surprising for the person skilled in the art.

LIST OF REFERENCE CHARACTERS

1 first pane
1.1 first base of the first pane 1
1.2 second base of the first pane 1
2 second pane
3 electrical heating region
3.1 first base of the electrical heating region 3
3.2 second base of the electrical heating region 3
4 thermoplastic intermediate layer
5.1,5.2 collecting conductors
6 electrically conductive coating
7 supply line
8 edge decoating
9 separating line
10 region
11 current path
12 coating-free region
13 connection cable
14 voltage source
100 pane
II surface of the second pane 2
III surface of the first pane 1
$b_1$, $b_2$ length of the base of the electrical heating region 3
d width of the separating line 9
$l_1$, $l_2$ length of the base of the first pane 1
$h_1$, $h_2$ height of the electrical heating region 3
r width of the edge decoating 8
A-A' section line

The invention claimed is:

1. A pane, comprising:
   a substantially trapezoidal first pane with a surface, a first base with length $l_1$ and a second base with length $l_2$, wherein a ratio v of the length $l_1$ to the length $l_2$ is such that:
   $v=l_1:l_2$ is from 0.70:1 to 0.98:1
   at least one electrically conductive coating applied on a part of the surface;
   at least one substantially trapezoidal electrical heating region electrically divided by at least one separating line from the electrically conductive coating, wherein a first base of the heating region is arranged immediately adjacent the first base of the first pane, and wherein a second base of the heating region is arranged immediately adjacent the second base of the first pane; and
   at least two collecting conductors connected to the electrically conductive coating in the electrical heating region, the at least two collecting conductors configured to establish an electrical connection to a voltage source such that a current path for a heating current is formed between the collecting conductors,
   wherein a ratio u of a length $b_1$ of the first base of the heating region to a length $b_2$ of the second base of the heating region is such that:
   $u=b_1:b_2$ is from v:0.99 to v:0.50.

2. The pane according to claim 1, wherein:
   $u=b_1:b_2$ is from v:0.99 to 0.99, or
   $u=b_1:b_2$ is from 1.01 to v:0.50.

3. The pane according to claim 1, wherein the first pane or the electrical heating region has a shape of a symmetrical trapezoid.

4. The pane according to claim 1, wherein the first base of the heating region is arranged substantially parallel to the first base of the first pane.

5. The pane according to claim 1, wherein the length of a shorter of the first base and the second base of the first pane is equal to the length of the immediately adjacent base of the heating region plus 2×r, wherein r is a width of an edge decoating region on each side of the pane.

6. The Pane according to claim 1, wherein a width d of the separating line is from 30 μm to 200 μm.

7. The Pane according to claim 6, wherein the width d of the separating line is from 70 μm to 140 μm.

8. The pane according to claim 1, wherein the collecting conductors are implemented as fired printing paste that has a specific resistance $\rho_a$ from 0.8 μohm·cm to 7.0 μohm·cm.

9. The pane according to claim 8, wherein the specific resistance $\rho_a$ is from 1.0 μohm·cm to 2.5 μohm·cm.

10. The pane according to claim 8, wherein the fired printing paste contains one or more of: a) metallic particles, b) metal particles, c) carbon particles and d) silver particles.

11. The pane according to claim 1, wherein the surface of the first pane is a really bonded to a second pane via a thermoplastic intermediate layer.

12. The pane according to claim 1, wherein the first pane or the second pane contains one of a) glass, b) polymers, and c) mixtures of a) and b).

13. The pane according to claim 12, wherein a) comprises flat glass, float glass, quarts glass, borosilicate glass, and/or soda lime glass.

14. The pane according to claim 12, where b) comprises one or more of polyethylene, polypropylene, polycarbonate, and/or polymethylmethacrylate.

15. The pane according to claim 1, wherein the electrically conductive coating is transparent.

16. The pane according to claim 1, wherein the electrically conductive coating has a sheet resistance from 0.4 ohm/square to 10 ohm/square.

17. The pane according to claim 16, wherein the sheet resistance is from 0.5 ohm/square to 1 ohm/square.

18. The pane according to claim 1, wherein the electrically conductive coating contains one or more of: a) silver (Ag), b) indium tin oxide (ITO), c) fluorine-doped tin oxide ($SnO_2$:F), and d) aluminum-doped zinc oxide (ZnO:Al).

19. The pane according to claim 1, wherein the electrically conductive coating has, inside the electrical heating region, at least one coating-free region.

20. The pane according to claim 19, wherein the at least one coating-free region forms a communication window.

21. The pane according to claim 19, wherein the at least one coating free region is arranged in a center region of one of the first base and the second base of the first pane.

22. The pane according to claim 2, wherein a distance $h_1$ between the at least two collecting conductors at a center of the electrical heating region is greater than a distance $h_2$ between the at least two collecting conductors at outer edges of the electrical heating region.

23. A method for producing a pane with an electrical heating region, the method comprising:
   (a) preparing a substantially trapezoidal first pane having a surface, a first base with length $l_1$, a second base with length $l_2$, wherein a ratio v of the length $l_1$ to the length $l_2$ is such that:
   $v=l_1:l_2$ is from 0.70:1 to 0.98:1;

(b) applying an electrically conductive coating on a part of the surface of the first pane;

(c) providing an electrical division of at least one substantially trapezoidal electrical heating region from the electrically conductive coating by forming at least one separating line;

arranging a first base of the heating region immediately adjacent the first base of the first pane; and arranging a second base of the heating region immediately adjacent the second base of the first pane, wherein a ratio u of a length $b_1$ of the first base of the heating region to a length $b_2$ of the second base of the heating region is such that:

$u=b_1:b_2$ is from v:0.99 to v:0.50; and (d) providing at least two collecting conductors for connection to a voltage source, the at least two collecting electrodes being connected to the electrically conductive coating in the electrical heating region such that a current path for a heating current is formed between the at least two collecting conductors.

24. The method according to claim 23, wherein the separating lines are formed by laser patterning.

25. A method comprising using the pane according to claim 1 in one or more of a) means of transportation for travel on land, in the air, or on water, b) as a functional individual piece, and c) as a built-in component in furniture, appliances, and buildings.

26. The method according to claim 25, wherein a) comprises a windshield, a rear window, side panes, and/or roof panel of a motor vehicle.

27. The method according to claim 25, wherein c) comprises an electrical heater.

* * * * *